United States Patent

[11] 3,596,584

[72] Inventor Harry S. Jones
   Monmouth Beach, N.J.
[21] Appl. No. 649,311
[22] Filed June 27, 1967
[45] Patented Aug. 3, 1971
[73] Assignee Chrom-Tronics, Inc.
   New York, N.Y.

[54] METHOD FOR CONVERTING RELIEF PHOTOGRAPHS
   3 Claims, 6 Drawing Figs.
[52] U.S. Cl. ................................... 95/18 P,
   352/53, 352/81, 353/33
[51] Int. Cl. .................................... G03b 35/08
[50] Field of Search ........................... 353/33;
   95/18, 18 P; 352/44, 58, 81, 53

[56] References Cited
UNITED STATES PATENTS
| 1,905,469 | 4/1933 | Ives | 355/77 |
| 2,562,077 | 7/1951 | Winnek | 355/43 X |

OTHER REFERENCES
Arthur W. Judge, " Stereoscopic Photography," 1950, pages 193, 194, 254 and 255.

Primary Examiner—Samuel S. Matthews
Assistant Examiner—Robert P Greiner
Attorneys—Robert E. Isner, Esq. and Nims, Halliday, Whitman, Howes, Collison and Isner ABSTRACT: Method of converting abnormal three-dimensional or relief photographic images into normal photographic reproductions thereof by physical separation of discrete film data strips selectively exposed through each lens element of a multielement lens overlay rotation thereof and reassembly thereof into a true composite photographic reproduction.

INVENTOR
HARRY S. JONES
BY
ATTORNEY.

METHOD FOR CONVERTING RELIEF PHOTOGRAPHS

This invention relates to relief photography and particularly to an improved method of converting abnormal three-dimensional or relief photographic images into normal photographic reproductions thereof.

The obtaining of relief or three-dimensional images or effects in the photographic arts has, for many years, challenged the skilled workers in this field. While the basic theory and the nature of the problems involved have long been known and understood, the present day dearth of simple, commercially practical and inexpensive relief photographs and methods of obtaining the same cogently demonstrate the continued inability of the art to solve the problems involved.

The prior efforts in this field reveal both simple and complicated systems having various advantages and limitations and which are divisible into three general classes. The first of these involves the taking of two photographs of a subject using one or two camera lenses located at two different positions relative to the subject. Such photographs are usually referred to as a stereo pair. The second class obtained the relief effect essentially by the taking, through a single lens, of a continuous series of photographs of the subject, as viewed from a continuous series of positions and recording the series through an array of very small auxiliary lenses or apertures located very close to the photographic film plane so that each image of the single lens aperture is sequentially focused upon the film by each of such auxiliary lenses or apertures. The third broad class involves the use of a lens usually of large diameter in association with a multielement lens overlay disposed intermediate the objective and the film plane which, while offering simplicities in camera construction, provides an "abnormal" image unless complicated image-inverting lens systems are additionally incorporated therewith.

This invention may be briefly described as a method of converting abnormal relief or three-dimensional photographic images into normal or true three-dimensional reproductions of the photographed subject and in its broad aspects includes the separation, physical rotation and rejoinder of each discrete film data strip selectively exposed through each lens element of the lens overlay included in such simplified apparatus of the third class referred to above by which the abnormal images that are usually attendant the use of such simplified camera apparatus are converted into true photographic representations of the image subject when viewed with a single layer of lenticular elements disposed adjacent to the film plane. In its narrow aspects, the subject invention includes means for effecting accurate location and identification of each discrete film data strip.

Among the advantages of the invention is the provision of abnormal to normal image conversion for relief photographic images that is particularly suitable for use in the creation of large displays as would be used for indoor and outdoor advertising or the like.

The primary object of this invention is the provision of an improved method for effecting the mechanical conversion of abnormal relief photographic images of a subject to true or normal three-dimensional representations of the subject.

Other objects and advantages of the invention will be apparent from the following portions of this specification and from the accompanying drawings which illustrate the principles of this invention and the incorporation of such principles into a presently preferred embodiment thereof.

Referring to the drawings:

FIG. 5 is an enlarged fragmentary view of a portion of the unit of FIG. 4.

FIG. 6 is a fragmentary schematic representation, in section, of a display unit constructed in accord with the principles of this invention.

Figure 1:
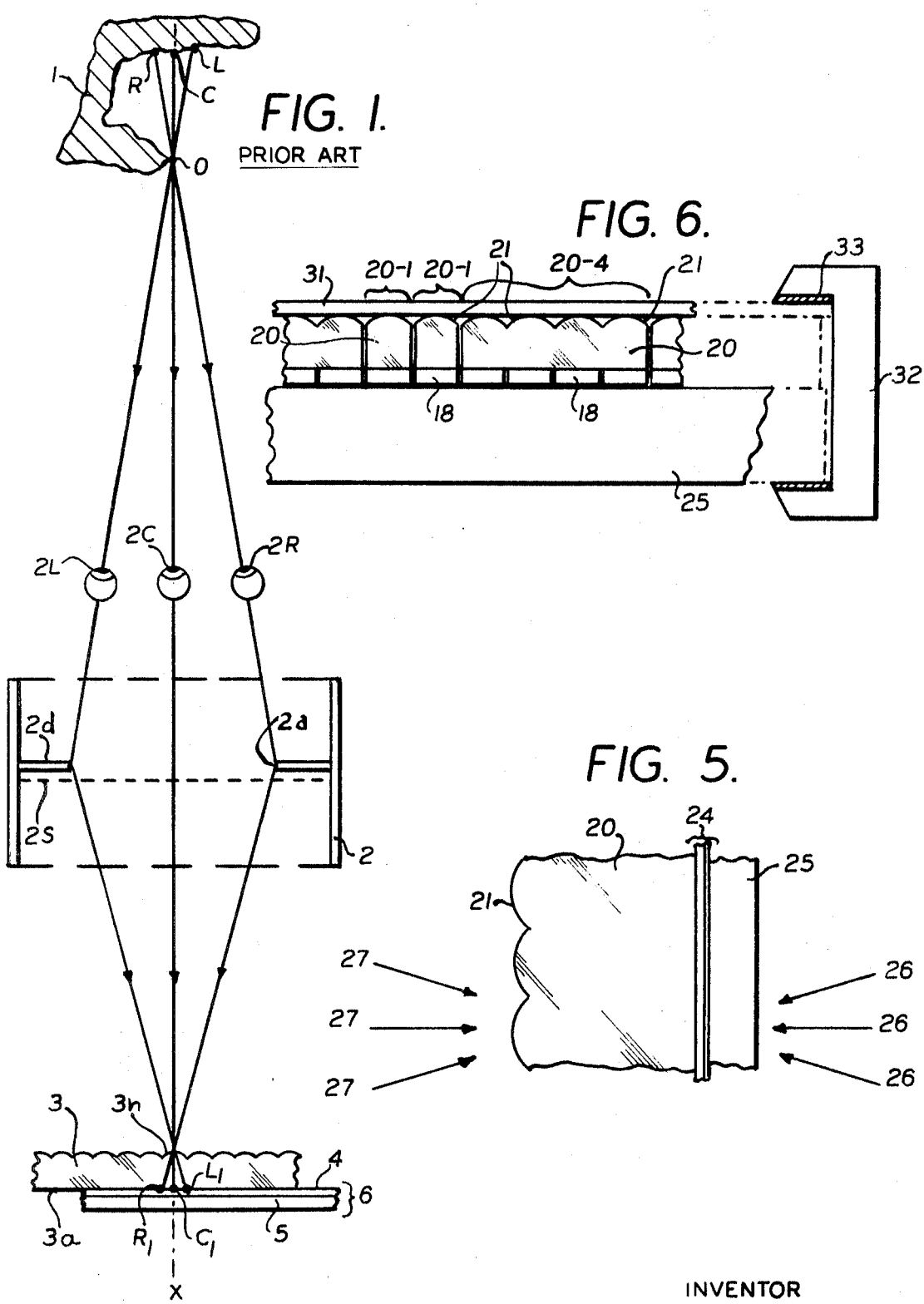
FIG. 1 is a schematic representation of the essentials of a simple photographic system of the third class referred to above employing the full lens aperture width of a large lens in conjunction with a single cylindrical lens overlay for obtaining relief photographic effects.

Referring to the drawings and particularly to FIG. 1, the essentials of a simplified camera system of the third class referred to above for obtaining relief photographic effects include a lens assembly incorporating a large aperture camera lens 2 and an associated aperture plate 2d whose aperture 2a constitutes a horizontally disposed rectangle of a length that is normally comparable with the spacing between the human eyes. In FIG. 1 the actual glass lens elements have been omitted for the purpose of simplicity and clarity. In order to obtain a three-dimensional photographic image of a subject all that is required is to utilize the rectangular aperture 2a at the stop plane of camera lens 2 and to project the image of the subject 1 onto a perpendicularly oriented cylindrical lens overlay 3 of transparent glass or plastic having a large number of small cylindrical lens surfaces 3n and having film 6 positioned adjacent the undersurface thereof. When the film 6 is exposed by means of any suitable shutter located in a plane 2s close to aperture 2a, a three-dimensional photographic image of a subject 1 may be taken. As will be apparent from the drawing, points 0 and C on subject 1 located on the optical axis X-X will be imaged on the film emulsion 4 on the axis X-X at point $C_1$.

Similarly, points 0 and R will be imaged at point $R_1$ on the film emulsion 4 and points 0 and L ill be imaged at point $L_1$ thereon. It should be noted that image point $R_1$ corresponds to points O and R as seen by a right eye 2R and image point $L_1$ corresponds to points O and L as seen by a left eye 2L. A single eye 2C placed between will see only points O and C. As is known to those skilled in the art, the purpose of any particular cylindrical lens element $3n$ of the cylindrical lens overlay 3 is to form an image of aperture 2a on the film emulsion 4. Preferably, the width of the aperture image formed by an individual cylindrical element $3n$ shall be the same as the width of each cylindrical lens element $3n$, that is, equal to the distance between $R_1$ and $L_1$.

As will be apparent to those skilled in this art, when the film 6 of FIG. 1, after exposure as outlined above, is processed to transparency form, a cylindrical lens overlay having cylindrical lens elements of the same width as employed in the lens overlay 3 which was used during exposure must be placed closely adjacent to the film in order to produce a three-dimensional or relief effect when it is viewed. However, the three-dimensional characteristics of this image will be abnormal. As used herein, an "abnormal" relief or three-dimensional image is one in which, as the viewer's head is moved to his right, the left side of the subject (i.e., relative to the viewer's left hand) will be increasingly revealed in contradistinction to the normal appearance of any subject in which, as the viewer's head is moved to the right, the right side of the subject (i.e., relative to the viewer's right hand) is increasingly revealed.

Even if the transparency is turned about a vertical axis, the image will still exhibit abnormal three-dimensional characteristics, and in the use of a simplified camera apparatus of the type shown in FIG. 1, there exists no possible orientation of a transparency or positioning thereof relative to the necessary viewing lens overlay in which the viewed image will appear both right-side right, top-side-up and be possessed of normal three-dimensional characteristics, even if one or more plane mirrors, or dove or wollaston prisms are used to reverse the image about horizontal and/or vertical axes.

The "abnormal" nature of the relief image as referred to above is caused by a reversed sequence of the three-dimensional image data recorded under each element of the lens array due to the limitations inherent in the simplified camera construction described. My copending application Ser. No. 649,308 filed June 27, 1967 discloses an optical system for effecting the image inversion of the three-dimensional data recorded on the film under each element of a lens array without corresponding inversion of the overall image and to thereby convert an abnormal relief image to one of normal character. As will be apparent from what follows, the subject method is directed to the attainment of the same result by mechanical means and will be particularly useful in the conversion of large-sized relief images as conventionally employable for advertising and display purposes.

Figure 2:
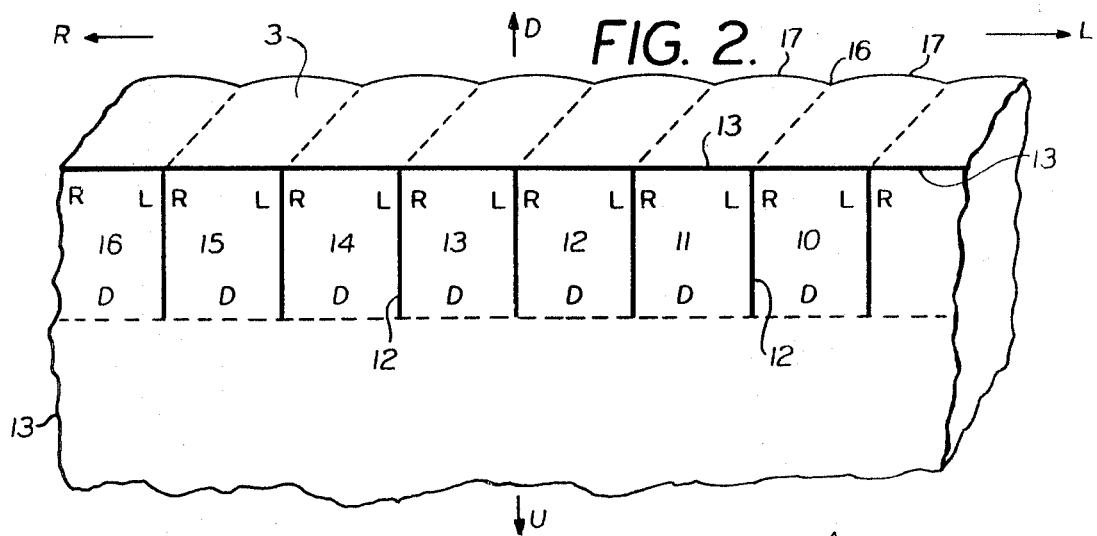
FIG. 2 is a schematic oblique fragmentary view of the undersurface of a cylindrical lens overlay of the type employed in FIG. 1 illustrating the relief image orientation relative thereto.
Figure 3:
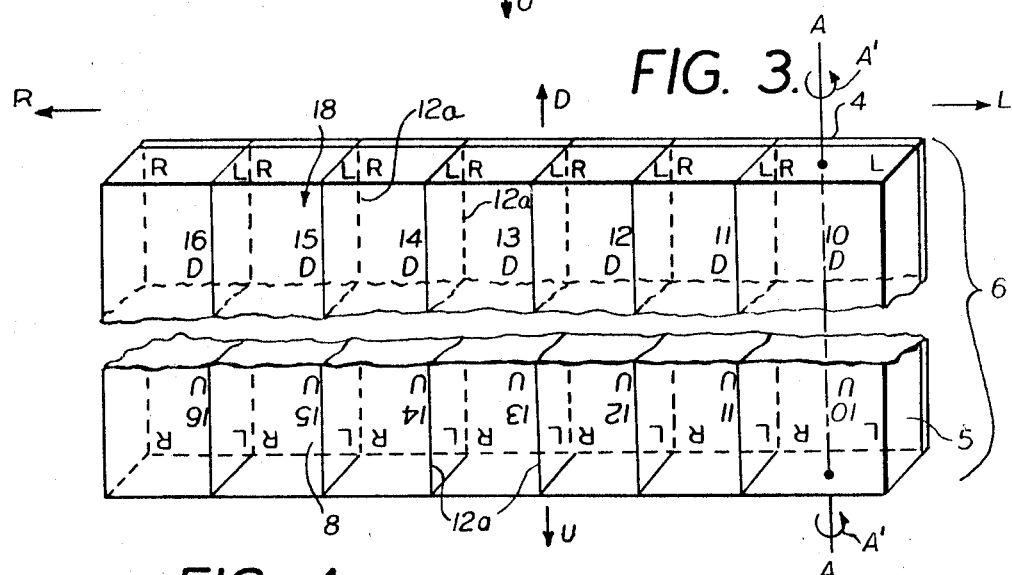
FIG. 3 is a schematic oblique fragmentary view of the film as the same would be disposed in interfacial relation with the underside of the lens overlay of FIG. 2 and illustrating the relief image orientation relative thereto.

Referring to FIGS. 2 and 3, delineation of the discrete data strips on the exposed film may be accomplished by means of the addition of spaced opaque lines 12 disposed upon the flat undersurface 13 of the cylindrical lens array 3 used in a simplified camera of the type referred to above. The lines 12 should, preferably, be located directly under each cusp 16 formed by adjacent cylindrical lens elements 17 of lens array 3, as delineated by the dotted lines which are disposed perpendicular to the undersurface 13 when an auxiliary collimating lens is used in the camera adjacent to lens overlay 3 for the purpose of bringing all off-axis rays passing through the center of the camera lens to perpendicular incidence with lens overlay 3, as described in my said copending application Ser. No. 649,308 filed June 27, 1967. When a collimating lens is not used, the opaque lines 12 should be disposed on the undersurface 13 along the lines of projection between the center of the camera lens and each cusp 16. In this case, only the single opaque line 12 through which the optical axis x-x of the camera lens passes will be (for all practical purposes) directly under the nearest adjacent cusp 16 and all other opaque lines 12 will be displaced by small amounts away from the positions shown in FIG. 2 with the spacing therebetween increasing progressively toward each edge.

As shown in FIG. 3, at the time of exposure the opaque lines 12 will be contact printed as lines 12a upon the edge of the film 6 having its photosensitive emulsion 4 disposed in interfacial contact with the undersurface 13 of the camera lens array 3. The opaque lines 12 may extend any desired distance inwardly from the edges of the lens array 3 but, desirably, should be limited in extent to the regions close to the edge so that the lines 12a appear only near the edge when film 6 is subsequently viewed.

In FIGS. 2 and 3, the camera lens and the subject being photographed (not shown) may be considered as being located below the plane of the sheet of drawings and the letters R, L, U and D indicate the directions right, left, up and down, respectively, on the subject, as would be see by a viewer disposed behind and looking at the overlay 3 and film 6 as film 6 would be exposed in a simple camera of the FIG. 1 construction. Letters of this type or equivalent coded markings indicating numerical designation of each film segment are desirably used in conjunction with the opaque lines so that each data strip on the film 6 may subsequently be identified and conveniently reoriented after physical separation by transverse severing along the lines 12a. Such indicia are preferably included in the lens overlay so as to be exposed on the film concurrently with the subject exposure thereon. Such indicia function to prevent the severed film strips from subsequently being placed in incorrect positions across the overall picture format upon reassembly thereof.

Figure 4:
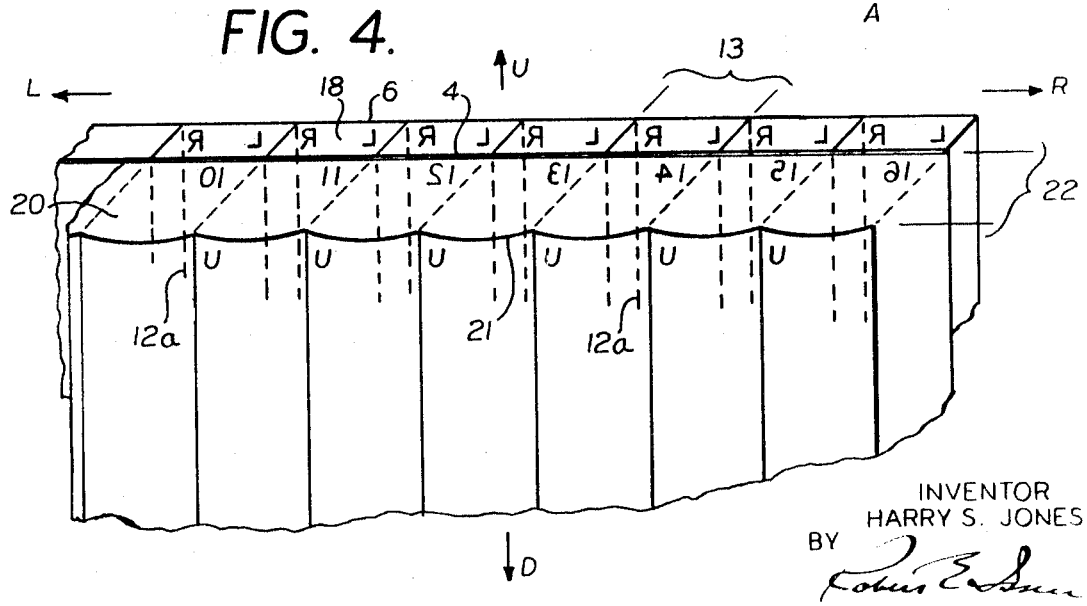
FIG. 4 is a schematic oblique fragmentary view of the film strip of FIG. 3 modified and reassembled in accordance with the principles of this invention together with an associated readout or viewing lens array.

With the relief film strip position marking numbers and the directional U, D, R and L marking letters provided on the exposed film 6 as described above, each severed strip is then rotated 180° about its long axis A-A as indicated by the arrows A', and reassembled in its original position or sequence across the overall photographic image in interfacial contact with a readout or viewing lens array 20, as shown in FIG. 4, subsequent to inversion to properly orient the U and D format.

When the modified relief photograph assembly of FIG. 4 is viewed through the lens array 20, the composite and reassembled photograph will possess normal relief characteristics and the up, down, right and left portions of the subject will be seen in the same relative positions as in the original subject. The readout lens overlay or array 20 may have lens elements 21 of the same curvature as elements 17 of the camera lens array 3, or of any other curvature and thickness 22 suitable for readout or viewing at a desired optimum viewing distance. However, the widths of the viewing lens elements 21 and the discrete relief data strips must be the same.

The cutting and reassembly operation described above is most suitably and advantageously done after enlargement of the original abnormal transparency to the requisite size desired for display purposes. Such enlargement may readily be accomplished by conventional equipment and technique utilizing either the entire original abnormal transparency or any single or subgroup of discrete relief data strips.

After the corrective reassembly of the individual relief data strips as described above has been effected, the final enlarged photograph 24 may be in the form of a transparency, a print or a reproduction produced by any process, for example, nonphotographic single or multicolor mechanical process such as lithography, as generally shown in FIG. 5. When the enlarged corrected photograph 24 is a transparency, a backplate 25 of light-diffusing character may be located adjacent to one side thereof to provide diffused illumination through back lighting 26. In contradistinction therewith, when the photograph 24 is a photographic print or a mechanical print, an opaque backplate 25 may be employed and front illumination 27 used for front viewing. The corrected photograph 24, viewing lens array 20 and backplate 25 may be held in intimate interfacial contact by any suitable usual means, such as by transparent cement or by auxiliary clamping means such as a frame.

In the case of very large displays, it may not be feasible or practical to utilize a unitary full-size viewing lens array, as for example, 20 feet to 30 feet wide or larger and having 300 to 1,500 lens elements, each of which may be ¼ inch to ¾ inch wide. In such cases, the entire picture format ma be subdivided into individual vertical relief data substrip assemblies as shown in FIG. 6 ranging in the width from one relief data strip 20–1 up to subassemblies 20–4 of four discrete data strips or subassemblies of any larger number thereof.

In the case of outdoor displays that are exposed to the weather, the lens arrays 20 used in subassemblies may when desired be made of plastic. In conjunction therewith, a protective window of glass or other suitable transparent material 31 covering any desired number of relief elements should desirably be placed over the entire assemblage to provide protection against rain, dust and moisture, the entire "sandwich" being sealed in a weatherproof frame 32 of any suitable construction having a peripheral gasket 33 to seal the contents therewithin.

Having thus described my invention, I claim:

1. A method of converting abnormal relief photographs exposed through a lenticular surface formed of a multiplicity of individual essentially coplanar lens elements and constituting a planar sheet of film made up of a multiplicity of narrow discrete elongate relief data strips each baring a continuous sequence of reversely oriented relief image data thereon comprising the steps of severing said planar sheet of film along lines of demarcation disposed intermediate said discrete narrow elongate relief data strips to provide a multiplicity of individual edge-abutting relief data strips each containing a continuous sequence of reversely oriented relief image data, rotating each said severed strip 180° about its own longitudinal axis and repositioning each of said rotatably displaced severed strips with their adjacent edge in closely abutting relation to provide a composite reconstituted normal relief photograph.

2. The method as set forth in claim 1 including the step of rejoining the rotatively displaced strips along their adjacent abutting edges.

3. A normal relief photograph produced by the process of claim 1.